July 26, 1932.  F. G. PURINTON  1,868,850
MACHINE FOR COATING A MULTIPLICITY OF ARTICLES
Filed Dec. 3, 1930   5 Sheets-Sheet 1

Inventor.
Forrest G. Purinton
by Heard Smith & Tennant
Attys.

July 26, 1932.  F. G. PURINTON  1,868,850
MACHINE FOR COATING A MULTIPLICITY OF ARTICLES
Filed Dec. 3, 1930  5 Sheets-Sheet 2

Inventor.
Forrest G. Purinton
by Heard Smith & Tennant.
Attys

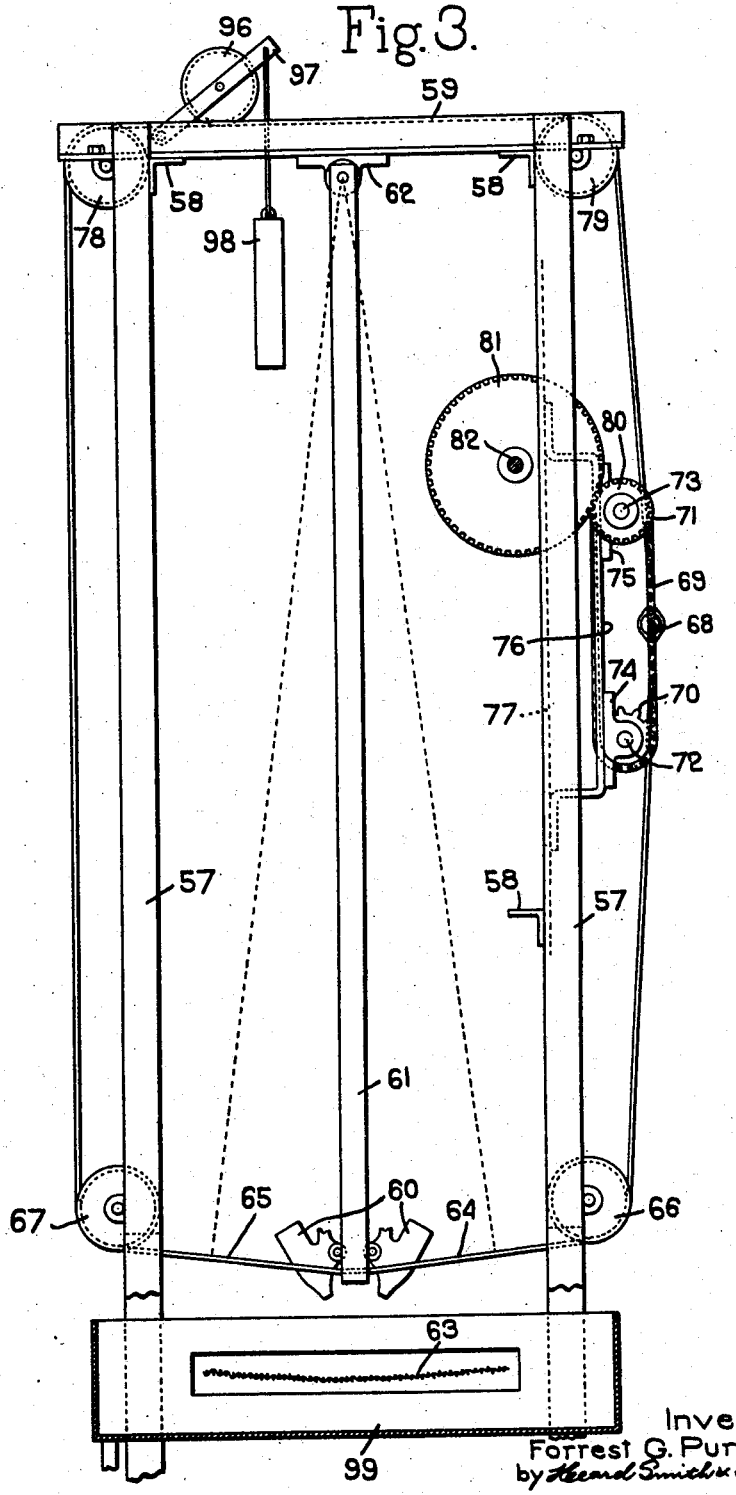

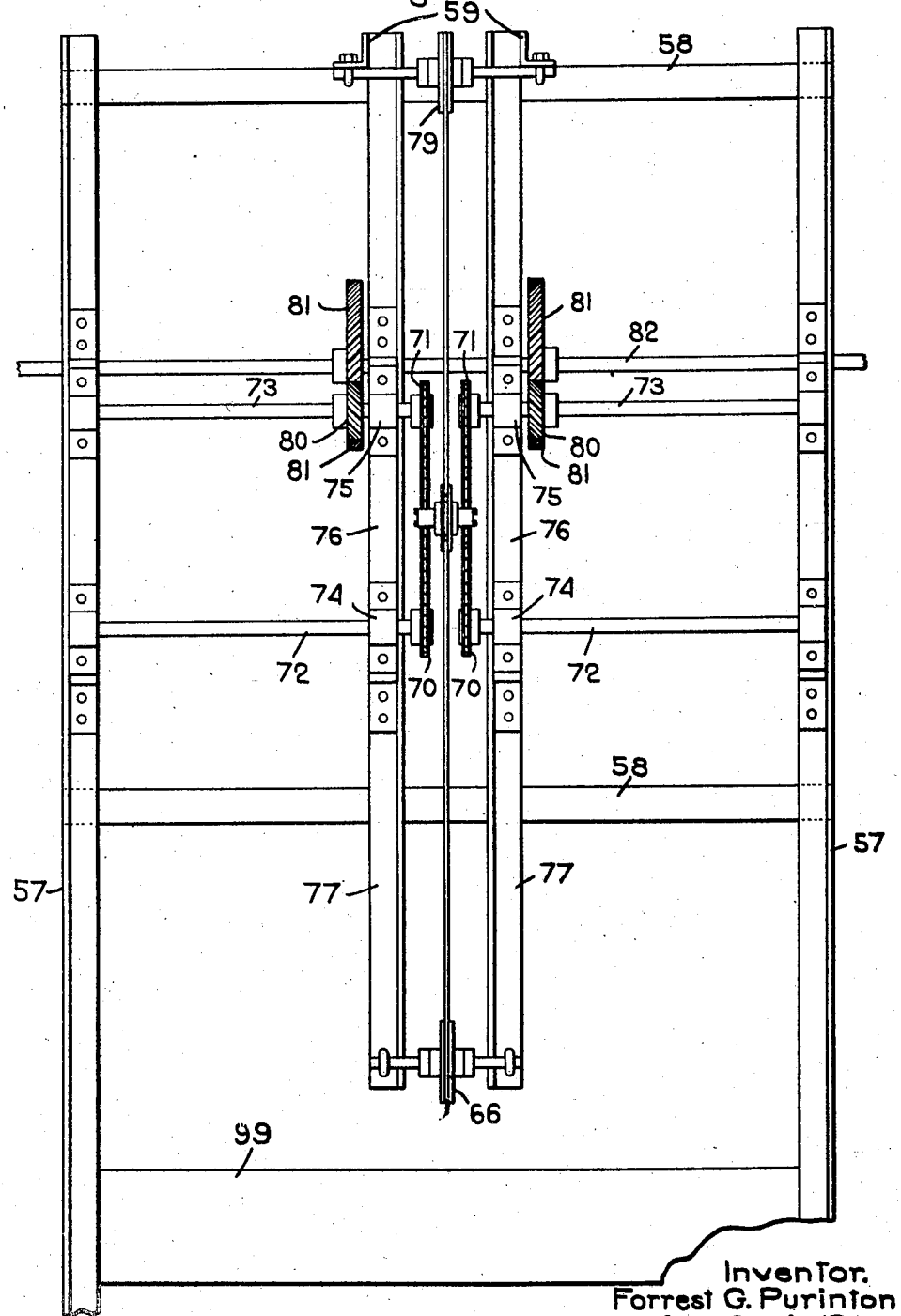

July 26, 1932.  F. G. PURINTON  1,868,850
MACHINE FOR COATING A MULTIPLICITY OF ARTICLES
Filed Dec. 3, 1930   5 Sheets-Sheet 5
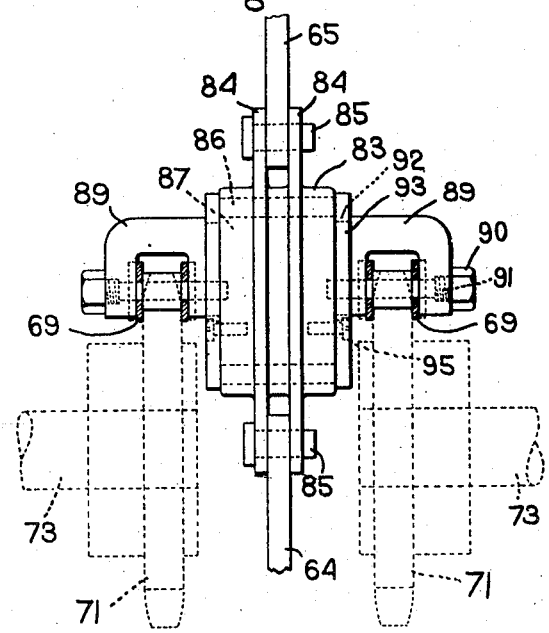
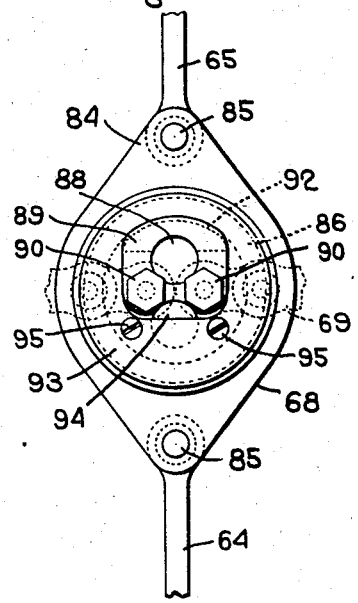
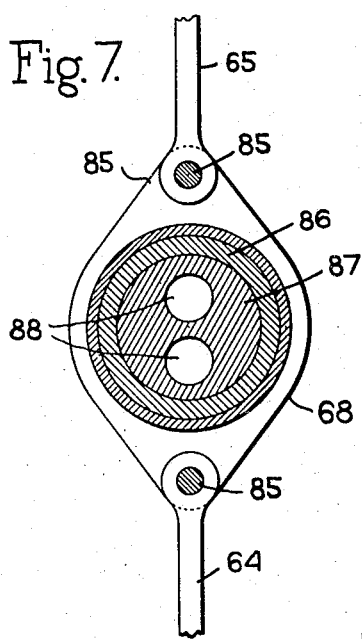
Inventor.
Forrest G. Purinton
by Heard Smith & Tennant.
Attys.

Patented July 26, 1932

1,868,850

UNITED STATES PATENT OFFICE

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT

MACHINE FOR COATING A MULTIPLICITY OF ARTICLES

Application filed December 3, 1930. Serial No. 499,718.

This invention relates to improvements in machines for painting, or otherwise coating, a multiplicity of articles, such as buttons, carried in separate but closely juxtaposed position, by a travelling conveyer through the field of paint-applying mechanism, such as spraying means.

One of the objects of the invention is to provide novel mechanism for moving the spraying means transversely of the direction of movement of the travelling carrier of such a character as to permit the use of a wider carrier than has heretofore been considered practical, thereby greatly increasing the capacity of the machine.

A further object of the invention is to provide a machine of the character specified with novel mechanism for imparting a reciprocating uniform movement to the spraying means throughout the entire width of the travelling carrier.

Another object of the invention is to provide a machine of the character specified with paint-receiving means located below the article-supporting means, and means for reciprocating the same in unison with the reciprocation of the painting means so that the paint, passing through the perforations in the carrier, will be collected in such a manner as to be readily salvaged.

A further object of the invention is to provide an endless travelling carrier comprising an endless chain having means for releasably supporting trays for transportation through the painting field, and also preferably through a drier.

These and other objects and features of the invention will more fully appear from the following description and the accompanying drawings and will be particularly pointed out in the claims.

The present invention comprises improvements in machines for painting articles of the general type disclosed in my prior application Serial Number 153,512, filed December 9, 1926.

In the drawings:

Fig. 3 is a view, mainly in end elevation, of a modified construction embodying the invention;

Fig. 4 is a detail side elevation showing the mechanism for moving the painting means transversely of the direction of movement of the travelling carrier which supports the articles to be painted;

Fig. 5 is an enlarged detail view, mainly in elevation, showing the travelling carrier which is pivotally connected to and operable by parallel sprocket chains to produce a reciprocating uniform movement of the painting means;

Fig. 6 is an end elevation of the construction illustrated in Fig. 5; and,

Fig. 7 is a central vertical sectional view of the construction illustrated in Figs. 5 and 6.

Figure 1:
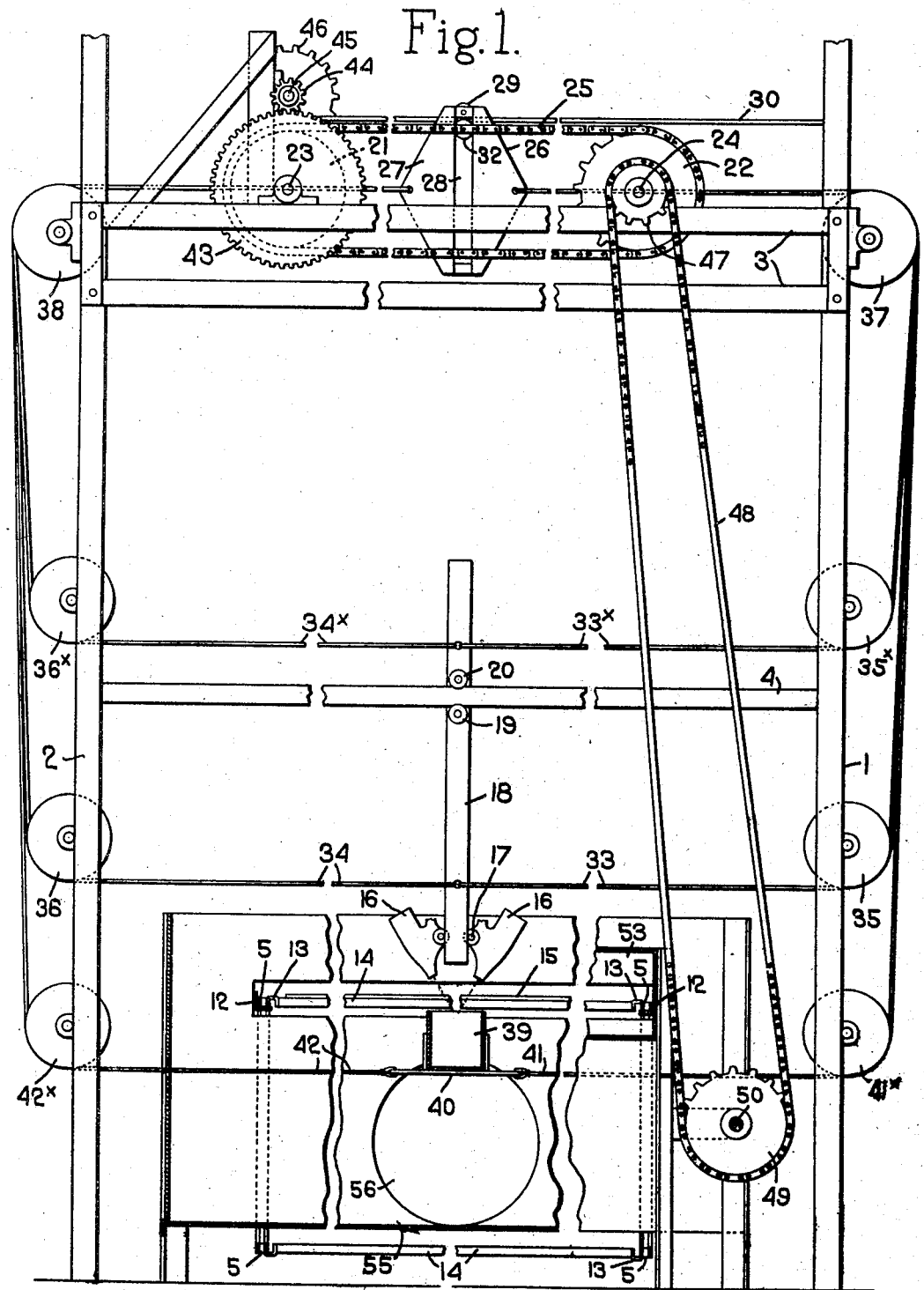
Fig. 1 is a view, partly in end elevation and partly in vertical section, of such portions of a machine for painting a multiplicity of articles as are necessary to illustrate the present invention.
Figure 2:
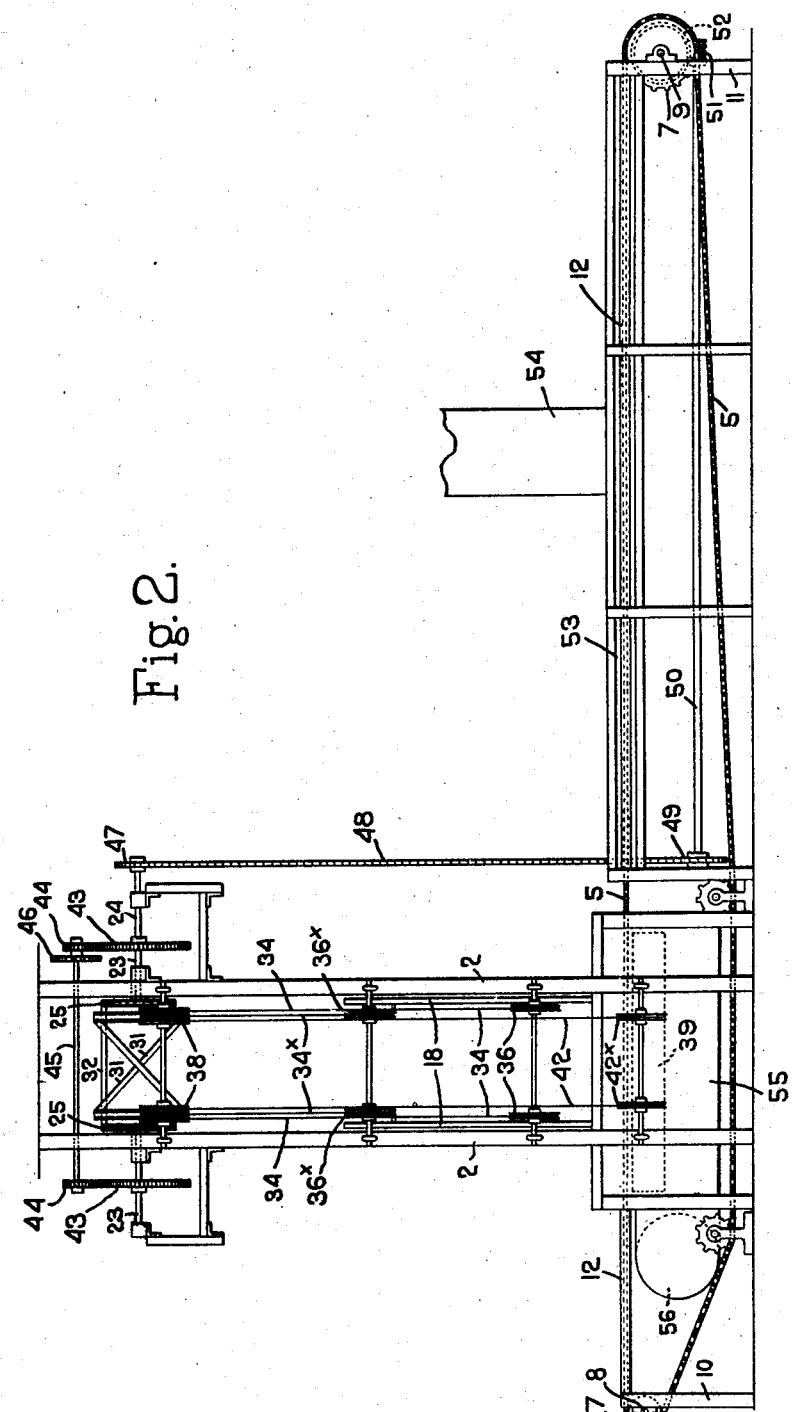
Fig. 2 is a side elevation of a painting machine embodying the mechanisms illustrated in Fig. 1.

The construction illustrated in Figs. 1 and 2 of the drawings comprises a main frame having side frames 1 and 2 connected by suitably spaced girders, certain of which such as the girders 3 and 4, which support the mechanism for causing the painting mechanism to move transversely of the carrier, being shown.

A travelling carrier is located between the side frames and extends longitudinally thereof. Preferably the travelling carrier comprises parallel endless sprocket chains 5 which are spaced apart and carried by sprocket wheels 6 and 7 mounted upon shafts 8 and 9 which are journalled in suitable bearings mounted upon uprights 10 and 11 of a carrier frame having chain-supporting guides 12.

Preferably certain of the links of the endless chains 5 are provided with curved bar-supporting members 13 upon which transverse bars 14 are mounted, said bars being spaced apart such reasonable distances as may be necessary to receive and support a series of trays 15 for supporting a plurality of the articles to be painted in narrowly separated jutxaposition.

The trays 15 may be formed of wire fabric, or of perforated sheet material, to permit the greater portion of the paint, which is not deposited upon the articles supported thereby, to pass through the perforations of the tray.

Any suitable means may be employed to drive the endless travelling carrier at a uniform rate of speed, such, for example, as that which will hereinafter be described. The painting mechanism comprises preferably a plurality of spraying devices 16 which desirably are adjustably supported upon rods 17 which are carried by vertical supports 18 having studs provided with anti-friction rollers 19 and 20 which engage the upper and lower surfaces of the transverse girder 4 which serves to guide the vertical supporting bars 18 and the spraying means carried thereby horizontally transversely of the direction of movement of the travelling carrier.

Means are provided for imparting a reciprocating uniform movement to the spraying means throughout at least the entire width of the travelling carrier. In the constructions illustrated herein this is accomplished by flexible members which are connected to the support for the spraying means and extend in opposite directions therefrom and which are pivotally connected at their upper end to a traveller which is pivotally connected to an endless chain or chains driven at a uniform speed and so disposed that the amplitude of reciprocation of the traveller is at least equal to the width of the travelling carrier which supports the articles to be painted.

In the construction illustrated herein sprocket wheels 21 and 22 are secured to the inner ends of pairs of axially alined shafts 23 and 24 which are journalled in suitable bearings mounted upon the cross girder 3, the pairs of shafts being spaced apart a distance at least equal to and preferably slightly greater than the width of the travelling carrier which supports the trays 15. Endless sprocket chains 25 are mounted upon the pairs of sprocket wheels 21 and 22 and extend transversely of the frame. A suitable traveller is pivotally connected to the sprocket chains in such a manner that it is caused to move back and forth with a uniform movement throughout the entire distance between the vertical planes of the sprocket wheel shafts 23 and 24.

In the construction illustrated in Figs. 1 and 2 the traveller comprises vertical plates 26 and 27 which are connected together at their upper and lower ends, but spaced apart to provide a vertical slot 28 therebetween. In order to reduce the weight of the traveller, the plates 26 and 27 may be formed of sheet metal of channel shape in cross section, with the webs of the respective channels forming the walls of the slot 28.

The traveller plates are supported at their upper ends by anti-friction rollers 29 mounted upon horizontal tracks 30 located in parallelism with and preferably slightly above the upper leads of the chains 25. Suitable pairs of cross bars 31 connect the traveller plates together to form a rigid structure.

The traveller is actuated by the chains through a cylindrical bar 32 which is pivotally mounted at its opposite ends upon the chains 25 and extends through the slots 28 in the traveller plates.

As illustrated in Fig. 1 the movement of the upper lead of the sprocket chain when driven at a uniform speed causes the traveller to move at a uniform speed throughout the distance between the vertical planes of the axes 23 and 24 of the sprocket wheels 21 and 22. When the bar 32 passes beyond the vertical plane of the shafts 23, as the chain passes around the sprocket wheel 21, the bar 32 will be carried downwardly in the slot 28 until the bar 32 is carried along the lower lead of the sprocket chain, whereupon the bar 32, while located in the lower end portion of the slot 28, will move the traveller in the opposite direction throughout the lower lead of the sprocket chain at the same uniform speed as that caused during the movement of the carrier produced while it was traversing the upper lead of the sprocket chain.

The reciprocating uniform movement of the traveller is imparted to the spray-supporting means by one or preferably two pairs of flexible members 33 and 34, 33x and 34x, which are connected at their adjacent ends to the vertical supporting bar 18 for the paint-spraying means, the flexible members 33 and 34 preferably being connected to the bar 18 below the guide 4 and in proximity to the spraying device, while the flexible members 33x and 34x are connected to the bar above the guide 4.

The flexible members 33 and 34 respectively pass over sheaves 35 and 36 so positioned as to direct the members 33 and 34 substantially at right angles to the direction of movement of the travelling carrier. The flexible members 33x and 34x similarly pass over sheaves 35x and 36x so positioned that the members 33x and 34x are in parallelism with the members 33 and 34. The flexible members 33 and 34, 33x and 34x, are then carried upwardly over sheaves 37 and 38 and at their ends connected to the traveller plates 26 and 27.

Desirably paint-receiving means are provided for collecting the surplus of paint which passes through the perforations or interstices of the travelling carrier, so that accumulation of hardened paint beneath the painting field will be avoided and a considerable portion of the excess paint projected by the spraying means salvaged. This is accomplished in the present invention by providing a receptacle 39 which desirably is of rectangular form supported beneath and in proximity to the article-supporting means of the travelling carrier in the path of the spray which passes through the interstices of the article-supporting means and which is reciprocated in synchronism with the paint-spraying means. In the preferred construction illustrated the receptacle 39 is supported by a cradle 40 having upwardly extending arms to permit the removal and replacement of the receptacle.

The cradle 40 is in turn supported by flexible members 41 and 42, such as cables which pass over suitable sheaves 41x and 42x so mounted upon the side frames 1 and 2 as to maintain the lower leads of the flexible members 41 and 42 substantially horizontal. The flexible members 41 and 42 extend upwardly from the sheaves 41x and 42x over the sheaves 37 and 38 and are connected at their ends to the traveller plates 26 and 27 respectively.

In the operation of the device, therefore, a continuous uniform movement of the sprocket chain will produce a reciprocating uniform movement of the traveller which, acting through said flexible members, will reciprocate the paint-spraying means at uniform speed throughout the entire width of the travelling carrier which supports the articles to be painted, and will also reciprocate the paint-receiving means in synchronism therewith.

Any suitable means may be provided for driving the sprocket chain. In the construction illustrated herein, (see Fig. 2) the shafts 23 are provided with gears 43 which are engaged by pinions 44 upon a shaft 45 having secured thereto a sprocket wheel 46 driven from any suitable source of power.

In order properly to drive the travelling carrier in timed relation to the movement of the traveller, the shaft 24 is provided with a sprocket wheel 47 which drives a sprocket chain 48 which passes over a suitable sprocket wheel 49 upon a shaft 50 extending longitudinally of the carrier frame. A worm 51, mounted upon the end of the shaft 50, engages a worm gear 52 which is fixedly secured to the shaft 9. By reason of this construction the rotation of the shaft 9 will drive the sprocket wheels 7 and thereby impart a continuous uniform movement to the sprocket chains 5 of the travelling carrier which will move the trays supported thereupon through the painting field with a uniform speed of movement properly correlated to the reciprocating movements of the spraying means. The travelling carrier also moves the trays at the desired uniform rate through the drier 53 which is supported by the carrier frame 12. The drier may be, and preferably is, like that disclosed in my prior application aforesaid, and is provided with a duct 54 to permit the escape or withdrawal of the volatile solvents for the paint.

Desirably a suitable casing 55 encloses the painting field through which the travelling endless carrier passes and is provided with an exhaust duct 56 through which the fumes of volatile solvent, liberated during the spraying operation, may be exhausted in the manner disclosed in my prior application aforesaid.

In Figs. 3 to 7 inclusive another embodiment of the invention is illustrated which comprises side frames formed of uprights 57 and girders 58 connected together by cross girders 59 resting upon the top girders 58 of the side frames. In this construction the paint-spraying means 60 are supported upon vertical bars 61 which are pivotally mounted at their upper ends upon a bracket 62 secured to the top cross girders 59, and means are provided for oscillating the cross bar 61 transversely of the direction of movement of the carrier.

The carrier in this construction desirably is in the form of an endless screen 63, which may be a reticulated wire screen or a perforated endless sheet of flexible material adapted to support the articles to be painted in narrowly spaced juxtaposition. The endless carrier desirably is so supported as to present a concave article-supporting face approximately concentric with the pivotal axes of the bars 61 which support the spraying means, as disclosed in my prior application aforesaid.

In this construction, as in that previously described, reciprocation or oscillation of the spraying means is produced by a flexible endless member or cable which is connected to the supporting bar 61 for the spraying means with the members 64 and 65 of said flexible member extending in opposite directions therefrom. The members 64 and 65 are guided in directions substantially perpendicular to the direction of movement of the endless carrier 63 by sheaves 66 and 67 and are connected at their other ends to a suitable traveller 68 which is connected to and actuated by parallel endless chains 69 mounted upon sprocket gears 70 and 71, the shafts 72 and 73 of which are mounted in suitable bearing brackets 74 and 75 which in turn are mounted upon suitable brackets 76 carried by a supplemental vertical frame comprising parallel members 77 which are secured to the girders 58 of the side frames.

The shaft of the sheave 66 for the flexible member 64 desirably is mounted upon the lower end portions of the parallel members 77. The guiding sheave 67 for the flexible member 65 is mounted upon the other side frame and together with other guiding sheaves 78 and 79 mounted upon the cross girders 59 serve to guide the flexible member 65, also in substantially the vertical plane in which the support 61 for the painting means reciprocates, to the traveller 68, so that the flexible members 64 and 65 present in effect a substantially rectangular closed loop connected to the traveller and to the swinging support for the paint-spraying means.

In this construction, as in that previously described, the sprocket wheels 70 and 71 are respectively mounted upon the adjacent ends of axially alined, but separated shafts 72 and 73 which are journalled in suitable bearings in the side frames 57, and also in bearings carried by the supplemental frame members 77, thereby providing a space between the chains to permit the traveller to be carried along both leads of the endless chains.

Any suitable means may be provided for driving the sprocket wheel shafts 73. As illustrated herein, the shafts 73 are each provided with spiral pinions 80 which respectively engage larger spiral gears 81 fixedly secured upon the driving shaft 82 mounted in suitable bearings in the main frame.

In the construction illustrated in Figs. 4 to 7 inclusive, the traveller comprises a cylindrical metal casing 83 provided with spaced flanges 84 between which the ends of the flexible members 64 and 65 are pivotally mounted upon suitable studs 85. An annular bushing 86, desirably of oil-soaked wood, or other fibre, is mounted within the cylindrical casing 83 and a cylindrical metallic block 87 is rotatably mounted within the bushing 86. The weight of the block may be minimized by suitable apertures 88 therethrough. The ends of the main portion of the cylindrical block 87 desirably are flush with the ends of the cylindrical casing 86, but are provided with oppositely extending U-shaped integral extensions 89 to which the links of the chain 69 are secured by studs 90 extending through the legs of the U-shaped extension and having screw threaded portions 91 engaging complementary threads in the outer legs of the U-shaped extensions.

The U-shaped extensions desirably are provided at their upper ends, adjacent the ends of the casing, with grooves 92 into which keeper disks 93 may be inserted to prevent relative end-wise movement between the block 87 and the casing. The keeper disks 93 are of circular form and are provided with central recesses 94, the lower portions of which are rectangular and the upper portion articulately curved to conform to the groove 92.

In assembling the device above described the keeper disks 93 are passed over the U-shaped extensions 89 of the block 87 and dropped down into the groove 92 and are thereupon secured by suitable screws 95 to the block 87. By reason of this construction relative end-wise movement of the cylindrical casing and the block is prevented, while relative rotation thereof about the common axis of the block and the cylindrical casing is permitted.

Inasmuch as the U-shaped extensions of the cylindrical block are secured to the chains 69 and in effect form links of the chains, the traveller will be carried by the sprocket chains along the outer and inner leads thereof and around the sprocket wheels 70 and 71. During such movement the traveller will be moved at a uniform speed throughout the lengths of the outer and inner leads of the traveller distances equal to the space between the axes of the shafts 72 and 73 of the sprocket wheels, and a reciprocating or oscillating uniform movement will be imparted to the support for the paint-spraying means, so that the latter will project paint uniformly upon the articles supported by the travelling carrier, particularly when the travelling carrier is so supported as to present a concave upper face substantially concentric with the axis about which the support for the paint-spraying means is oscillated.

While in the present construction the endless chains for actuating the traveller are mounted upon one of the side frames, it will be obvious that said chains may be mounted upon the other side frame, or upon the top of the frame, or in any suitable position to enable them to perform the functions above described.

Desirably a suitable belt-tightening device, such as a roller 96, engaging the flexible member 65 and mounted upon a lever 97 pivoted at one end to the frame and provided at its other end with a counterweight 98, may be employed to insure proper tension upon the flexible members and to take up any lost motion which otherwise might occur by the stretching of the flexible members.

Any suitable means may be provided for driving the travelling endless carrier 63 in properly timed relation to the reciprocation of the paint-spraying means as will be readily understood from the description of the construction illustrated in Fig. 1, or my previous application aforesaid.

Desirably a suitable receptacle 99 may be located below the painting field of the reciprocating paint-spraying means to collect such paint as passes through the interstices of the travelling carrier for the articles being painted.

It will be understood that the particular embodiments of the invention disclosed herein are of an illustrative character and not restrictive of the meaning and scope of the following claims.

Having thus described the invention, what is claimed as new, and desired to be secured by Letters Patent, is:

1. A painting machine comprising a travelling carrier, means for supporting thereupon a multiplicity of articles to be painted, paint-applying means, means for supporting said paint-applying means to permit reciprocation thereof transversely of the direction of movement of said travelling carrier, flexible members connected to the support for said paint-applying means, means for guiding said flexible members in opposite directions therefrom transversely of said carrier, means for actuating said flexible members alternately to produce a reciprocating uniform movement of said paint-applying means throughout the width of said travelling carrier, paint-receiving means reciprocably mounted below said paint-applying means and beneath the article-supporting means, and means for reciprocating said paint-receiving means in unison with the reciprocation of the paint-applying means.

2. A painting machine comprising a travelling carrier, means for supporting thereupon a multiplicity of articles to be painted, paint-applying means, means for supporting said paint-applying means to permit reciprocation thereof transversely of the direction of movement of said travelling carrier, paint-receiving means mounted to reciprocate transversely of said carrier below said paint-applying means, flexible members respectively connected to the support for said paint-applying means and to said paint-receiving means, means for guiding said flexible members in opposite directions therefrom transversely of said carrier, and travelling endless actuating means connected to said flexible members operable to produce a reciprocating uniform movement of said paint-applying means throughout the width of said travelling carrier.

3. A painting machine comprising a travelling carrier, means for supporting thereupon a multiplicity of articles to be painted, paint-applying means, means for supporting said paint-applying means to permit reciprocation thereof transversely of the direction of movement of said travelling carrier, flexible members connected to the support for said paint-applying means, means for guiding said flexible members in opposite directions therefrom transversely of said carrier, parallel endless actuating members driven at a uniform speed, a traveller pivotally connected to said endless members and connected to adjacent ends of said flexible members operable to produce a reciprocating uniform movement of said paint-applying means throughout the width of said travelling carrier.

4. A painting machine comprising a travelling carrier, means for supporting thereupon a multiplicity of articles to be painted, paint-applying means, means for supporting said paint-applying means to permit reciprocation thereof transversely of the direction of movement of said travelling carrier, flexible members connected to the support for said paint-applying means, means for guiding said flexible members in opposite directions therefrom transversely of said carrier, a plurality of parallel endless actuating members driven at a uniform speed, a traveller pivotally connected to said endless members and connected to adjacent ends of said flexible members operable to produce a reciprocating uniform movement of said paint-applying means throughout the width of said travelling carrier, paint-receiving means reciprocably mounted below said paint-applying means and below said article-supporting means, and flexible members connected to said paint-receiving means extending in opposite directions therefrom and connected at their other ends to said traveller and operable thereby to reciprocate said paint-receiving means in unison with said paint-applying means.

5. A painting machine comprising a main frame having side frames and transverse girders connecting the same, a travelling carrier located between and movable longitudinally of said side frames having means for supporting a multiplicity of articles, paint-spraying means, means for supporting the same from said frame to reciprocate transversely of the direction of movement of said carrier, parallel endless chains mounted upon sprocket wheels having their axes spaced apart distances at least equal to the width of said travelling carrier, a traveller located intermediate of said parallel chains and pivotally connected at its ends to the respective chains, flexible members connected to said traveller and to the support for said spraying means, and means for guiding said flexible members in opposite directions from the support for said spraying means transversely of said carrier, and means for driving said endless chains at a uniform speed.

6. A painting machine comprising a main frame having side frames and transverse girders connecting the same, a travelling carrier located between and movable longitudinally of said side frames having means for supporting a multiplicity of articles, paint-spraying means, means for supporting the same from said frame to reciprocate transversely of the direction of movement of said carrier, parallel endless chains mounted upon sprocket wheels having their axes spaced apart distances at least equal to the width of said travelling carrier, a traveller located intermediate of said parallel chains and connected at its ends to said chains, flexible members connected to said traveller and to the support for said spraying means, means for guiding said flexible members in opposite directions from the support for said spraying means transversely of said carrier, means for driving said endless chains at a uniform speed, paint-receiving means reciprocably mounted beneath said article-supporting means in the path of the spray projected by said spraying means, and means for reciprocating said paint-receiving means in unison with the reciprocation of said paint-spraying means.

7. A painting machine comprising a main frame having side frames and transverse girders connecting the same, a travelling carrier located between and movable longitudinally of said side frames having means for supporting a multiplicity of articles, paint-spraying means, means for supporting the same from said frame to reciprocate transversely of the direction of movement of said carrier, parallel endless chains mounted upon sprocket wheels having their axes spaced apart distances at least equal to the width of said travelling carrier, a traveller located intermediate of said parallel chains and connected at its ends to said chains, flexible members connected to said traveller and to the support for said spraying means, means for guiding said flexible members in opposite directions from the support for said spraying means transversely of said carrier, means for driving said endless chains at a uniform speed, paint-receiving means reciprocably mounted below said article-supporting means in the path of the spray projected by said spraying means, flexible members connected at one end to said paint-receiving means and extending in opposite directions therefrom and connected at their other ends to said traveller, and means for guiding said flexible members in directions substantially perpendicular to the direction of movement of said travelling endless carrier.

8. A painting machine comprising a main frame having side frames and transverse girders connecting the same, a travelling carrier located between and movable longitudinally of said side frames, paint-spraying means, supporting means therefor, guides for said supporting means mounted upon cross girders of said frame reciprocable transversely of the direction of movement of said carrier, pairs of shafts mounted in said side frames in axial alinement having sprocket wheels mounted upon their adjacent ends in proximity to the respective side frames, the pairs of shafts being spaced apart distances at least equal to the width of said travelling carrier, horizontal traveller guides mounted upon said side frames in proximity to the respective endless chains, a traveller having end plates reciprocably mounted on said guides and provided with vertical slots, studs on the respective chains pivotally and slidably engaging said slots, flexible members connected to said travellers and to the support for said spraying means, and means for guiding said flexible members in opposite directions from said supports transversely of said carrier, and means for driving the shafts of one of said pairs of sprocket wheels.

9. A painting machine comprising a main frame having side frames and transverse girders connecting the same, a travelling endless carrier located between and movable longitudinally of said side frames, paint-spraying means, supporting means therefor, guides for said supporting means mounted upon cross girders of said frames reciprocable transversely of the direction of movement of said carrier, pairs of shafts mounted in said side frames in axial alinement having sprocket wheels mounted upon their adjacent ends in proximity to the respective side frames, the pairs of shafts being spaced apart distances at least equal to the width of said travelling carrier, horizontal traveller guides mounted upon said side frames in proximity to the respective endless chains, a traveller having end plates reciprocably mounted on said guides and provided with vertical slots, studs on the respective chains pivotally and slidably engaging said slots, flexible members connected to said travellers and to the support for said spraying means, means for guiding said flexible members in opposite directions from said supports transversely of said carrier, means for driving the shafts of one of said pairs of sprocket wheels, and means for driving said travelling endless carrier from the shafts of one of said sprocket wheels in timed relation to the reciprocation of said traveller.

10. A painting machine comprising a main frame having side frames and transverse girders connecting the same, a travelling endless carrier located between and movable longitudinally of said side frames, paint-spraying means, supporting means therefor, guides for said supporting means mounted upon cross girders of said frame reciprocable transversely of the direction of movement of said carrier, pairs of shafts mounted in said side frames in axial alinement having sprocket wheels mounted upon their adjacent ends in proximity to the respective side frames, the pairs of shafts being spaced apart distances at least equal to the width of said travelling carrier, horizontal traveller guides mounted upon said side frames in proximity to the respective endless chains, a traveller having end plates reciprocably mounted on said guides and provided with vertical slots, studs on the respective chains pivotally and slidably engaging said slots, flexible members connected to said travellers and to the support for said spraying means, means for guiding said flexible members in opposite directions from said supports transversely of said carrier, means for driving the shafts of one of said pairs of sprocket wheels, and means for driving said travelling endless carrier from the shafts of one of said sprocket wheels in timed relation to the reciprocation of said traveller comprising a sprocket wheel upon said shaft, a sprocket chain driven thereby and engaging a sprocket wheel upon the shaft extending longitudinally of said endless carrier, a worm upon said longitudinally extending shaft, and a worm wheel fixedly secured to the shaft of a rotatable member upon which said travelling endless carrier is mounted.

11. A painting machine comprising a main frame having side frames and transverse girders connecting the same, a travelling carrier located between and movable longitudinally of said side frames, paint-spraying means, supporting means therefor, guides for said supporting means mounted upon cross girders of said frame reciprocable transversely of the direction of movement of said carrier, pairs of shafts mounted in said side frames in axial alinement having sprocket wheels mounted upon their adjacent ends in proximity to the respective side frames, the pairs of shafts being spaced apart distances at least equal to the width of said travelling carrier, horizontal traveller guides mounted upon said side frames in proximity to the respective endless chains, a traveller having end plates reciprocably mounted on said guides and provided with vertical slots, studs on the respective chains pivotally and slidably engaging said slots, flexible members connected to said travellers and to the support for said spraying means, means for guiding said flexible members in opposite directions from said supports transversely of said carrier, means for driving the shafts of one of said pairs of sprocket wheels, paint-receiving means reciprocably mounted beneath the article-supporting means in the path of the spray projected from said spraying means, flexible members connected at one end to said paint-receiving means and extending in opposite directions therefrom and connected at their other ends to said traveller, and means for guiding said flexible members in a direction substantially perpendicular to the direction of movement of said travelling endless carrier.

12. A painting machine comprising a main frame having side frames and transverse girders connecting the same, a travelling carrier located between and movable longitudinally of said side frames, paint-spraying means, means for pivotally suspending said spraying means from a transverse girder of said frame to swing transversely of said carrier, parallel endless vertical sprocket chains carried by spaced pairs of axially alined sprocket wheels mounted on one of said side frames, flexible members connected to the lower portion of said swinging supporting member and extending in opposite directions therefrom, a traveller connected to the other ends of said flexible members, means pivotally connecting said traveller to the respective endless chains, means for guiding said flexible members in directions substantially perpendicular to the direction of movement of said travelling carrier, and means for driving said endless chains at a uniform speed.

13. A painting machine comprising a main frame having side frames and transverse girders connecting the same, a travelling carrier located between and movable longitudinally of said side frames, paint-spraying means, means for pivotally suspending said spraying means from a transverse girder of said frame to swing transversely of said carrier, parallel endless sprocket chains mounted upon pairs of axially alined sprocket wheels, flexible members connected to the lower portion of said swinging supporting member and extending in opposite directions therefrom, a traveller comprising a cylindrical casing connected to the other ends of said flexible members, a cylindrical block mounted in said casing having extensions pivotally connected to said endless chains, and means for guiding said flexible members in directions substantially perpendicular to the direction of movement of said travelling carrier, and means for driving said endless chains at a uniform speed.

14. A painting machine comprising a main frame having side frames and transverse girders connecting the same, a travelling carrier located between and movable longitudinally of said side frames, paint-spraying means, means for pivotally suspending said spraying means from a transverse girder of said frame to swing transversely of said carrier, parallel endless sprocket chains mounted upon pairs of axially alined sprocket wheels, flexible members connected to the lower portion of said swinging supporting member and extending in opposite directions therefrom, a traveller comprising a cylindrical casing connected to the other ends of said flexible members, a cylindrical block mounted in said casing, a cylindrical bushing of oil-soaked wood within said casing, a metal block rotatably mounted in said bushing having U-shaped extensions, means for connecting said U-shaped extensions to said endless chains, means for guiding said flexible members in directions substantially perpendicular to the direction of movement of said travelling carrier, and means for driving said endless chains at a uniform speed.

15. A painting machine comprising a main frame having side frames and transverse girders connecting the same, a travelling carrier located between and movable longitudinally of said side frames, paint-spraying means, means for pivotally suspending said spraying means from a transverse girder of said frame to swing transversely of said carrier, parallel endless sprocket chains mounted upon pairs of axially alined sprocket wheels, flexible members connected to the lower portion of said swinging supporting member and extending in opposite directions therefrom, a traveller comprising a cylindrical casing connected to the other ends of said flexible members, a cylindrical block rotatably mounted in said casing having its ends flush therewith and provided with U-shaped extensions having keeper-receiving grooves flush with the ends of said casing, keeper disks having apertures of sufficient size to pass over said extensions seated in said grooves, means for securing said keeper disks to said block, means connecting said U-shaped extensions to said sprocket chains, means for guiding said flexible members in directions substantially perpendicular to the direction of movement of said travelling carrier, and means for driving said endless chains at a uniform speed.

16. A painting machine comprising a travelling carrier, means for supporting thereupon a multiplicity of articles to be painted, paint-applying means, means for reciprocating said paint-applying means transversely of said carrier, paint-receiving means reciprocably mounted below said paint-applying means and beneath the article-supporting means, and means for reciprocating said paint-receiving means in unison with the reciprocation of the paint-applying means.

In testimony whereof, I have signed my name to this specification.

FORREST G. PURINTON.